Figure 1:
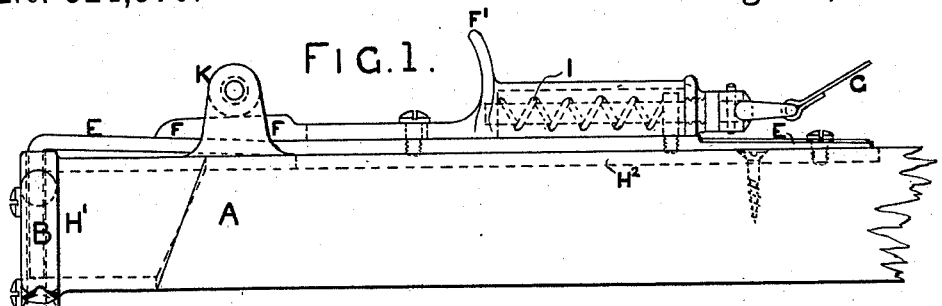

(No Model.)

E. BAILEY.
VEHICLE POLE TIP.

No. 524,570. Patented Aug. 14, 1894.

Witnesses.
Th.º Wilkins
N White

Inventor.
Edward Bailey

UNITED STATES PATENT OFFICE.

EDWARD BAILEY, OF FOLKESTONE, ENGLAND.

VEHICLE-POLE TIP.

SPECIFICATION forming part of Letters Patent No. 524,570, dated August 14, 1894.

Application filed October 5, 1893. Serial No. 487,211. (No model.) Patented in Germany July 8, 1893, No. 13,007; in France July 12, 1893, No. 218,315; in Austria-Hungary July 13, 1893; in Belgium July 14, 1893, No. 8,405, and in England September 13, 1893, No. 16,384.

*To all whom it may concern:*

Be it known that I, EDWARD BAILEY, a subject of the Queen of Great Britain, residing at No. 122 Foord Road, Folkestone, in the county of Kent, England, have invented certain new and useful Improvements in Means of Attaching Animals to and Detaching Them from the Poles of Carriages, Vans, and other Vehicles, (for which I have applied for Letters Patent in Great Britain, No. 16,384, on September 13, 1893; in Germany, No. 13,007, on July 8, 1893; in France, No. 218,315, on July 12, 1893; in Austria-Hungary, on July 13, 1893, and in Belgium, No. 8,405, on July 14, 1893,) of which the following is a specification.

By preference, instead of using plain eyes or loops forged in one piece with or riveted, pinned, or bolted to the iron at the front end of the carriage pole, I form the said eyes or loops in such way that a part or parts of them open when a sufficient strain in certain directions comes upon such part or parts, and close by means of a spring or springs sufficiently strong to keep the part or parts closed when the collar-chain or strap by which an animal is attached to the pole is in the normal position for the animal upon its feet. The said spring or springs are adjusted so that the movable part or parts of the eyes, loops, or hooks open immediately the draft animal attached thereto falls from any cause, and the collar-chain or strap in tension puts a strain on the movable part or parts. The fallen animal is thus at once liberated from the pole. I prefer also not to pass the collar-chains or straps by which animals are attached to the poles of vehicles through the said eyes, loops, or hooks, but I pass the said chains or straps through rings and I attach the animals to the said eyes, loops or hooks by means of the said rings.

Instead of accomplishing my object as hereinbefore described I sometimes form or fix upon the collar-hame, or on the breast-collar or breast-band of Dutch-harness, an eye, loop, or hook with movable part or parts similar to those hereinbefore mentioned for the carriage pole. Whether the said eyes, loops, or hooks are on the pole or on the hames of a collar, or on the breast-collar or breast-band of Dutch-harness, the position and the nature of the opening in each eye or loop, must be such that the spring or springs are not subject to the force of the animal in backing or turning but only to the weight of its head and neck when fallen.

If desired, eyes, loops or hooks with spring openings may be used both upon the pole and on the collar-hames, or on the breast-collars or breast-bands of Dutch-harness in respect of the same vehicle and animals.

Figure 2:
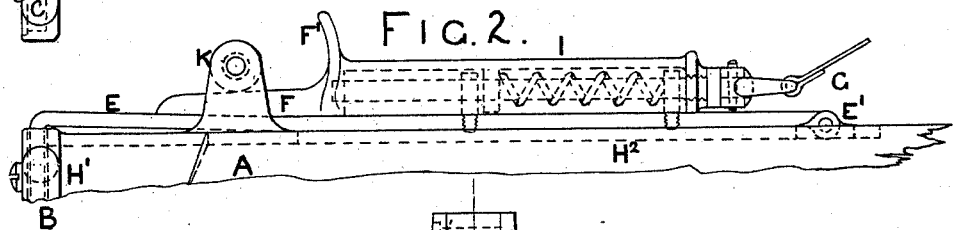
Figure 3:
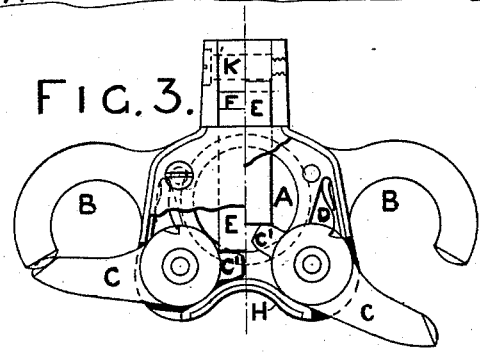
Figure 4:
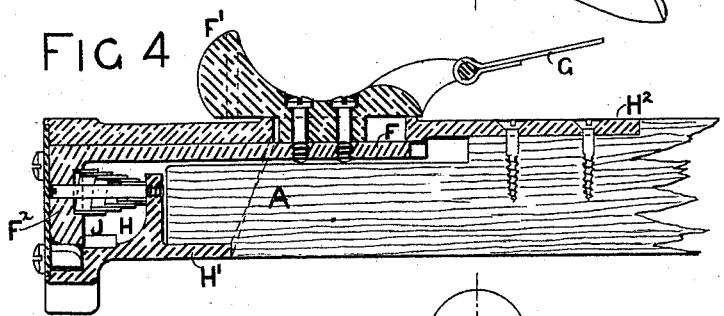
Figure 5:
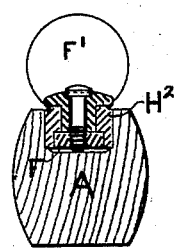
Figure 6:
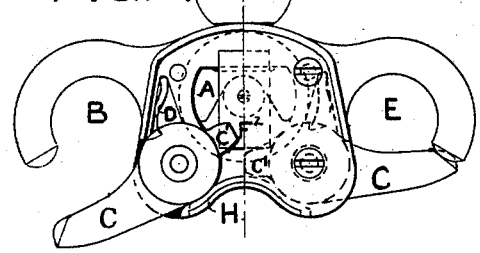

In the drawings, Figure 1. is a side elevation of one method of performing my said invention. Fig. 2. is a partial side elevation of a similar method; the drawback bolt F in this differing from that in Fig. 1. Fig. 3 is an end view of the same; with one half showing the movable part of the loop closed; the other half showing the movable part of the loop open, and part of the cover plate removed to show the internal arrangement. Fig. 4 is a longitudinal section of another method of performing my said invention. Fig. 5 is a cross section through the handle of draw-bolt F. Fig. 4. Fig. 6 is an end view similar to Fig. 3 but of the method shown in Fig. 4.

In all the figures similar parts, or parts used for similar purposes, are similarly lettered.

A. is the front end of the carriage pole.

B. B. are the eyes or loops to which animals are attached by means of rings on the collar straps.

C. is the part of the eye or loop B constructed to open.

D is a small spring which acts upon C to keep it closed, except a weight of about four pounds is pulling downward upon C.

E, Figs. 1 and 3 is a spring arranged to spring upward when the bolt F is drawn back by the strap G; but in Fig. 2 E is a bar, hinged at E', the weight of which tends to keep the movable parts C. C. closed.

H is the box in which the parts C. C. are hinged, and which forms a framework on which the eyes are formed and by which the whole apparatus is by a socket H' and tail H² at its back secured to the pole A.

In Figs. 1 and 2 a spiral spring I forces the bolt F back under the roller K and so presses E down. The front end of E is bent downward into the box and touches a tooth or projection C' on the boss of C and closes it; so that until the driver pulls back the bolt F, or some person pushes back that bolt by pressure at F', the parts C, C do not open.

In Figs. 4, 5, and 6, the bolt F is placed below the tail of the box H. in a recess formed in the wood of the pole A, and is thus protected from dust. The handle F' of the bolt is outside and is screwed to F as shown, there being a slot in the tail for the purpose of allowing sufficient end play to the bolt. In these views, Figs. 4, 5, and 6, too, the end $F^2$ of the bolt F is bent down to act on the teeth C' of the movable parts C of Figs. 4, 5, and 6. The bolt F is kept over the teeth C' by means of the spring J. The front edge of $F^2$ and the top back edges of C' are rounded off so that if the parts C drop a little, through the springs D getting a little weak, the spring J will force the bolt and close the movable parts C.

I do not limit myself to the means of performing my said invention described in this specification, but consider the methods shown to be the most suitable.

I am aware that prior to my invention, pole attachments have been made with an opening in part of the eyes or loops, which opening can be closed.

I therefore declare that what I claim, and desire to secure by Letters Patent, is—

1. In a pole tip or harness, the combination of an eye or ring consisting of a movable and an immovable part normally held in a closed position by means of a spring acting upon the movable part, together with a bolt or bar in conjunction with a spring or springs also acting upon the movable part of said eye, so that an outward pressure upon said movable part will force the same open and permit the ring of the harness inserted therein to slip out of said eye, substantially as set forth and described.

2. In a pole tip, the combination of a box with an eye or ring attached to either side thereof consisting of a movable and an immovable part normally held in a closed position by means of a spring acting upon the movable part, together with a bolt or bar in conjunction with a spring or springs also acting upon the movable part of said eye, so that a downward pressure upon said movable part of one of said eyes will force the same open and permit the ring of the harness inserted therein to slip out of said eye or ring without opening the other eye or ring, substantially as set forth and described.

Dated this 28th day of August, 1893.

EDWARD BAILEY.

Witnesses:
THOS. WILKINS,
N. WHITE.